United States Patent [19]

Hada et al.

[11] Patent Number: 5,633,669

[45] Date of Patent: May 27, 1997

[54] IMAGE FORMING APPARATUS FOR SYNTHESIZING A DIFFERENTIAL PEAK SIGNAL AND AN IMAGE SIGNAL

[75] Inventors: Yoshinobu Hada, Aichi-ken; Masaki Tanaka; Kazuyuki Fukui, both of Toyohashi; Kouichi Etou, Toyokawa, all of Japan

[73] Assignee: Minolta Co., Ltd., Osaka, Japan

[21] Appl. No.: 187,346

[22] Filed: Jan. 26, 1994

[30] Foreign Application Priority Data

Feb. 1, 1993 [JP] Japan ................................. 5-014595

[51] Int. Cl.⁶ .......................... B41J 2/385; B41J 2/47; B41J 2/39; G03G 13/04

[52] U.S. Cl. ...................... 347/132; 347/131; 347/133; 347/239; 347/255; 347/253

[58] Field of Search .......................... 347/133, 132, 347/131, 253, 247, 239, 255, 111

[56] References Cited

U.S. PATENT DOCUMENTS

| | | | |
|---|---|---|---|
| 5,115,259 | 5/1992 | Itoh | 347/131 |
| 5,128,699 | 7/1992 | Nakajima et al. | 347/131 |
| 5,189,441 | 2/1993 | Fukui et al. | 347/253 |
| 5,255,014 | 10/1993 | Haneda et al. | 347/132 |

*Primary Examiner*—John E. Barlow, Jr.
*Assistant Examiner*—Raquel Yvette Gordon
*Attorney, Agent, or Firm*—Sidley & Austin

[57] ABSTRACT

In a digital image forming apparatus, the intensity or the pulse width of laser beam exposure is modulated according to image signals of a document detected by a sensor. A peak waveform having a peak is generated in each light-emitting period of laser beam. For example, and a signal having a peak is synthesized with the image signals to generate the peak waveform. Thus, the laser is driven according to the peak waveforms so that the exposed portions on a photoconductor in correspondence to the peaks are exposed with a larger quantity of light at low densities. Then, the amount of the gamma correction can be decreased and the gradation characteristic can be stabilized.

23 Claims, 15 Drawing Sheets

IMAGE FORMING APPARATUS FOR SYNTHESIZING A DIFFERENTIAL PEAK SIGNAL AND AN IMAGE SIGNAL

BACKGROUND OF THE INVENTION

1. Field of the Invention

The present invention relates to an image forming apparatus such as a digital printer or a digital copying machine using electrophotographic process with modulation of laser beam.

2. Description of the Prior Art

In a digital image forming apparatus using electrophotographic process, a photoconductor is exposed with a laser beam. The laser beam is modulated according to multi-level digital data (or read data of a document) for reproducing a half-tone image. Thus, an electrostatic latent image is formed on the photoconductor in correspondence to the read data of a document. The latent image is developed to form a toner image, which is transferred to and fixed on a paper to reproduce the image of the document. In order to stabilize the reproduction of image, the maximum density is controlled to be kept constant. That is, the density of a standard toner image formed on the photoconductor is detected and the intensity of laser beam, the surface potential of the photoconductor or the like is adjusted.

Further, gradation correction of multi-level read data is important especially for a half-tone image or for a color image. In general, the image density level reproduced is not exactly proportional to the exposure level of laser beam due to various factors such as the photosensitivity characteristic of photoconductor, the toner characteristic, the environment and the like. Such nonlinearity is called as gradation characteristic (gamma characteristic), and it substantially degrades the fidelity of a reproduced image. Then, the output characteristic of laser power is corrected in order to realize linear characteristic. This is called a gradation correction (gamma correction). That is, for a multi-level read data, the output power is increased at low gradation levels, while it is decreased at high gradation levels, so as to make the density of a reproduced image proportional to the gradation of read data.

When a latent image is formed on a photoconductor, the quantity of exposure light of laser beam is modulated for each pixel according to read data corrected as explained above. The laser beam may be modulated on the intensity of laser beam under constant pulse width or on the pulse width thereof under constant intensity. In the intensity modulation, the intensity of laser beam is modulated for each pixel according to the read data after gradation correction while keeping the exposure time of laser beam constant for a pixel. In the pulse width modulation, the exposure time (pulse width) of laser beam is modulated for each pixel according to the read data after gradation correction while keeping the intensity of laser beam constant. In the two modulation methods, multi-gradation can be represented for each pixel. However, the output density characteristic (gamma characteristic) of a reproduced image becomes nonlinear against read data (quantity of exposure light). Therefore, the above-mentioned gamma correction is needed to obtain a desired reproduction characteristic.

The gamma correction becomes large especially at low densities (high-light portion), and the reproduction characteristic is liable to change. Further, even small noises may be reproduced. If the amount of gamma correction is small, the stability of reproduced image becomes better, and the image can be reproduced well at low densities. Therefore, it is desirable that the amount of gamma correction becomes small.

SUMMARY OF THE INVENTION

An object of the present invention is to provide an image forming apparatus wherein the output density characteristic is stabilized in an electrophotographic process using the modulation of laser beam.

In an image forming apparatus of this invention, the intensity or the pulse width of light beam for exposing a photoconductor by an exposure means is modulated according to digital image signals. In this invention, a drive signal for exposing the photoconductor has a peak, whereas a rectangular wave was used as a drive signal for the modulation previously. A peak waveform conversion means generates a peak waveform having a peak for each light-emitting period of the light beam. For example, clock signals are differentiated to generate peak signals having a peak and they are synthesized with the image signals to form the peak waveforms to be supplied to a drive means for driving the exposure means. The synthesis is performed for example by using addition or subtraction. In a different procedure, the image signals themselves may be differentiated for the waveform conversion. Then, the drive means controls an exposure means to emit the light beam according to the peak waveform having a peak in each period. Therefore, the quantity of exposure light can be enhanced on a photoconductor at positions in correspondence to the peaks of the peak waveforms. Thus, the nonlinearity of the gradation characteristic can be improved at low densities.

Preferably, the peak height of the peak waveform or drive signal is kept at a constant level. Thus, the nonlinearity of gradation characteristic can be improved because the peak height is large even for signals of small gradation levels.

Preferably, the waveform of synthesized drive signal has a larger slope with decreasing digital image signal. Thus, the peak width decreases to zero with decreasing digital image signal to zero. On the other hand, the slope of peak becomes gradual with increasing image signal while the converging level increases, so that a waveform tends to become rectangular. That is, the waveform of the drive signal can be changed at the start of an image signal due to the peak, and the nonlinearity of gradation characteristic can be decreased further.

An advantage of the present invention is that an image of many, say 256, gradation levels can be expressed well without changing the light-emitting period for a pixel.

Another advantage of the present invention is that the nonlinearity of gradation characteristic can be reduced so that the stability of output density characteristic can be improved.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
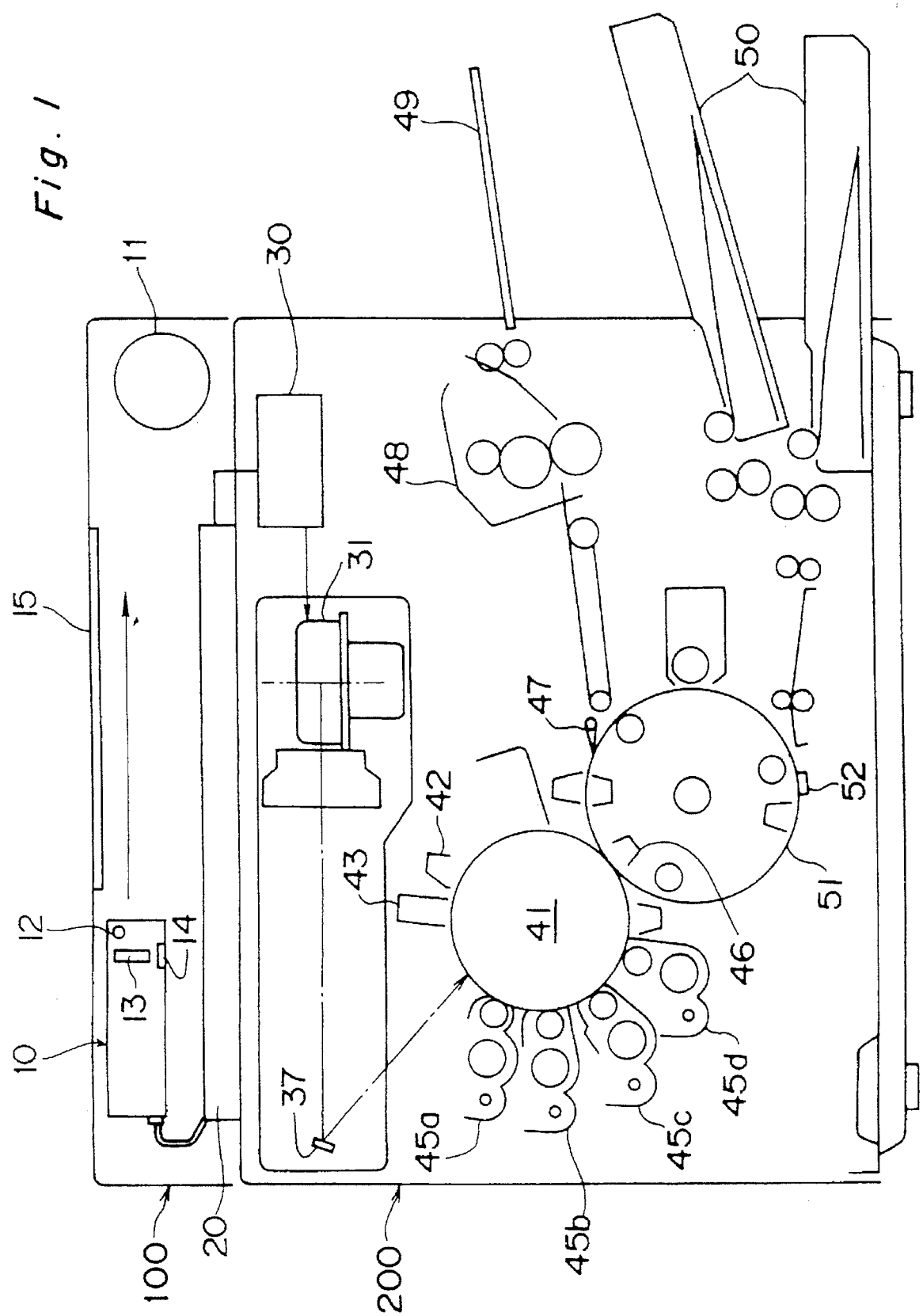
FIG. 1 is a schematic sectional view of a digital color copying machine.

Referring now to the drawings, wherein like reference characters designate like or corresponding parts throughout the views, FIG. 1 shows a schematic structure of a digital color copying machine which consists mainly of an image reader section 100 for reading a document image and a printer section 200 for reproducing the document image read by the image reader section 100.

In the image reader section 100, a scanner 10 includes an exposure lamp 12, a rod lens array 13 to collect reflection light from a document put on a platen 15 and a contact type charge-coupled device (CCD) color image sensor 14 to convert the collected light to an electric signal. The scanner 10 is driven by a motor 11 to move in a direction (subscan direction) of the arrow shown in FIG. 1. The optical image of the document illuminated by the exposure lamp 12 is converted by the image sensor 14 into multi-level electric signals of red r, green g and blue b. The electric signals are converted by a read signal processor 20 to gradation data of yellow Y, magenta M, cyan C or black K to be stored in a buffer memory 30.

Figure 2:
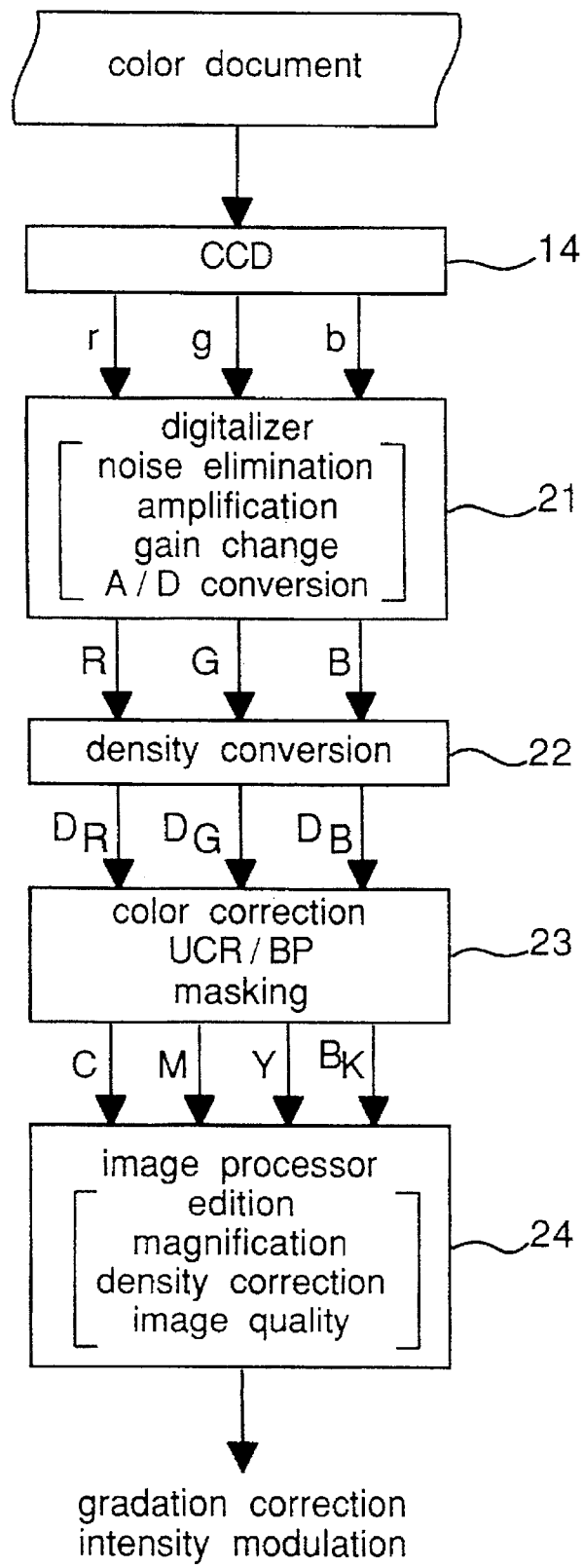
FIG. 2 is a block diagram of a read signal processor for processing image data detected by a CCD sensor.

FIG. 2 shows the read signal processor for processing image data read by the CCD sensor 14. The optical image of a color document positioned on platen 15 is converted by the CCD sensor 14 to analog signals r, g, b of document reflectivity data. The analog signals are processed next by a digitalizer 21. First, after noises thereof are removed, the signals are amplified. Then, the gain is changed and the signals are converted to digital signals R, G, B of reflectivity data. These data are converted next by a density converter 22 with log conversion to density data $D_R$, $D_G$ and $D_B$. Then, in a color correction section 23, the density data are processed for color correction. For example, black data K is subtracted from the density data $D_R$, $D_G$ and $D_B$ and they are converted to gradation data of yellow Y, magenta M, cyan C or black K. Finally, the gradation data are processed by an image processor 24 for edition, magnification change, density correction, image quality correction or the like and are output as read data.

In image-forming in the printer section 200, the read data are processed for example for gamma correction, and then they are used for exposure on a photoconductor to form an electrostatic latent image. In the printer section 200, a print head 31 performs gamma correction and a waveform conversion to be explained later on the read data received from the read signal processor 20, and it converts the corrected data to a digital drive signal to drive a laser diode 121 (refer FIG. 3) provided in the print head 31.

A laser beam emitted from the laser diode 121 according to the read data exposes a photoconductor drum 41 driven to be rotated, via a reflection mirror 37 as shown with a dot and dash line. Thus, an image of the document is formed on the photoconductor of the drum 41 with raster scan. The photoconductor drum 41 has been illuminated by an eraser lamp 42 and sensitized uniformly by a sensitizing charger 43 for each copy before the exposure. When the exposure is performed onto the photoconductor in the uniformly charged state, the potential at exposure positions in the photoconductor decreases and an electrostatic latent image is formed on the photoconductor drum 41. Then, one of developers 45a–45d of yellow, magenta, cyan and black toners is selected to develop the latent image. If the decay potential of the latent image becomes lower than the bias potential of the developer 45a–45d, toners adhere to the photoconductor drum 41 to form a toner image. The toner image is transferred by a transfer charger 46 onto a paper wound on a transfer drum 51.

The above-mentioned printing process is repeated four times for yellow, magenta, cyan and black. In this process, the scanner 10 repeats the scanning in synchronization with the motion of the photoconductor drum 41 and the transfer drum 51. Then, the paper is separated from the transfer drum 51 by operating an separation claw 47, and the toner image is fixed by a fixer 48 and the paper is carried out to a paper tray 49. In this process, a paper is supplied from a paper cassette 50 and is chucked at the top of the paper by a chucking mechanism 52 on the transfer drum 51 in order to prevent a shift of position in the four successive printing procedures.

In the embodiments to be explained below, the control system of the printer section differ on the generation of drive signals of a laser diode (L/D) 121.

A. First Embodiment

Figure 3:
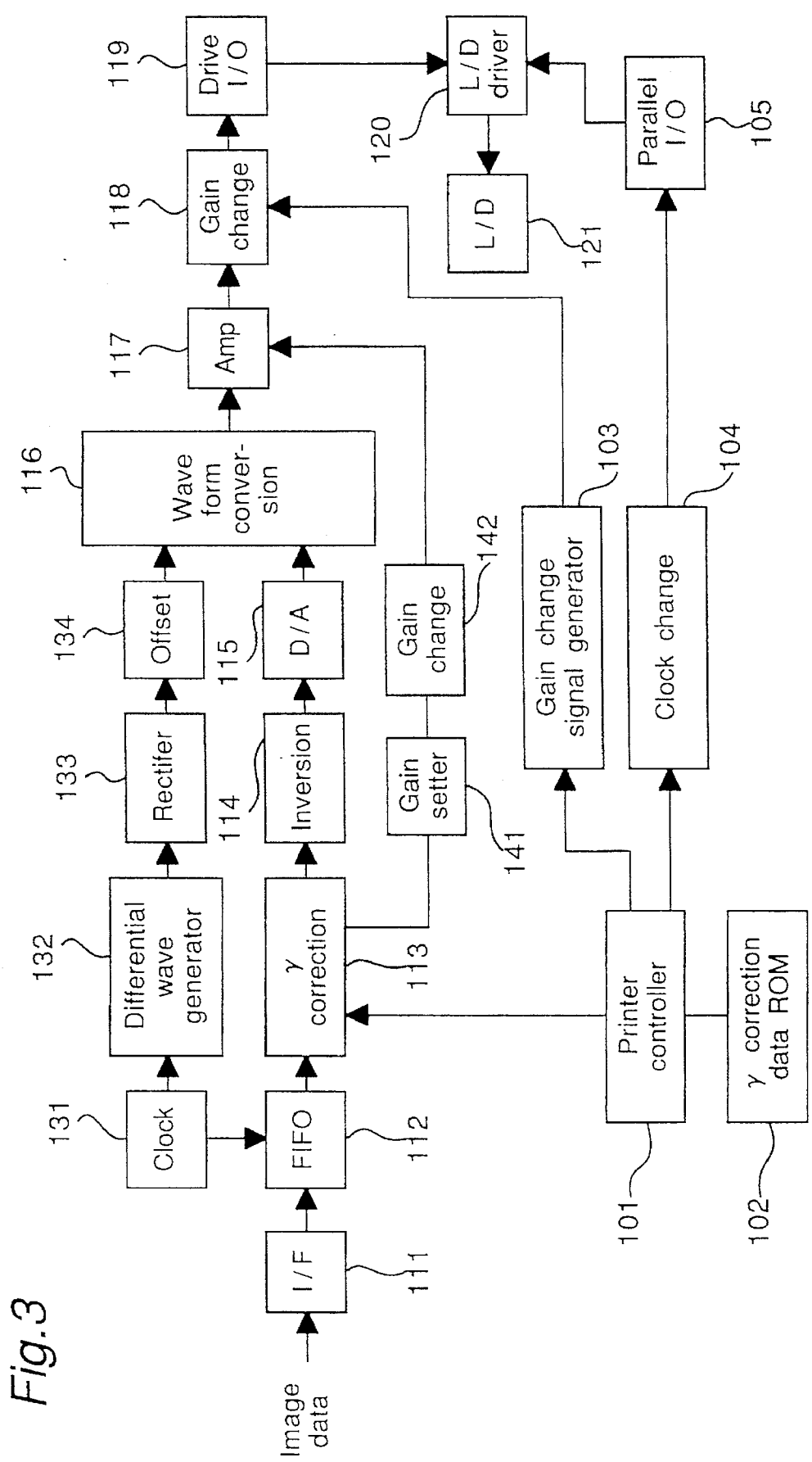
FIG. 3 is a block diagram of a control system of the copying machine in a first embodiment.

FIG. 3 show a printer control system of a first embodiment of this invention. The printer section 200 is controlled by a printer controller 101 having a central processing unit. The printer controller 101 is connected to a gamma data ROM 102 besides a control ROM (not shown) storing a control program and a data ROM (not shown) storing various data. The multi-level image data received from the buffer memory 30 via an interface 111 are stored in a first-in first-out (FIFO) memory 112. When a latent image is formed, the printer controller 101 sends gamma correction data read from the ROM 102 to a gamma correction circuit 113. The image data read from the FIFO memory 112 are corrected by the gamma correction circuit 113 and inverted next by an inversion circuit 114, for example from 0–1024 to 1024–0. The inverted value is converted to an analog value by a digital-to-analog (D/A) converter 115 and sent to a waveform conversion circuit 116. Further, a gain (or an amplification factor) of an amplifier 117 is set by a gain setter 141 according to the output of the gamma correction circuit 113 in order to keep the maximum of the peak voltage at a constant level for each dot, and a gain change circuit 142 sends the gain set by the gain setter 141 to the amplifier 117.

On the other hand, a waveform generator 132 generates a differential wave by differentiating a clock signal generated by a clock generator 131. (The clock signal is also supplied to the clock change circuit 104.) The differential wave has peaks of different polarity at the rising and trailing edges. Then, the differential wave is rectified by a rectifier 133 to remove an inverse polarity portion of the output signal so that the differential wave has a single polarity. Next, an offset circuit 134 adjusts a constant of the output signal, which is sent to the waveform conversion circuit 116.

The waveform conversion circuit 116 synthesizes an input signal received from the D/A converter 115 with the differential wave received from the offset circuit 134 and generates an intensity modulation signal therefrom. Next, the signal is amplified by the amplifier 117 to have a constant peak height. The printer controller 101 sets a gain of the entire system to correct the effects of the photoconductor sensitivity, the environment and the like and the gain is sent to a gain change signal generator 103. A gain change signal generated by the gain change signal generator 103 is sent to a gain change circuit 118. The output signal of the amplifier 117 is further amplified by the gain change circuit 118 with the resulting signal to be sent via a drive inoput/output (I/O) circuit 119 to a laser diode (L/D) driver 120. Thus, the driver 120 drives the laser diode (L/D) 121 according to drive signals having peaks.

The printer controller 101 sends a signal to a clock change circuit 104 to change the duty ratio of modulation clocks for driving the laser diode 121. The modulation clocks of the designated duty ratio are sent via a parallel input/output (I/O) circuit 105 to the laser diode driver 120. Thus, the drive signals generated by the L/D driver 120 can be modulated with the duty ratio. The duty ratio is explained later on a modified embodiment.

Figure 4:
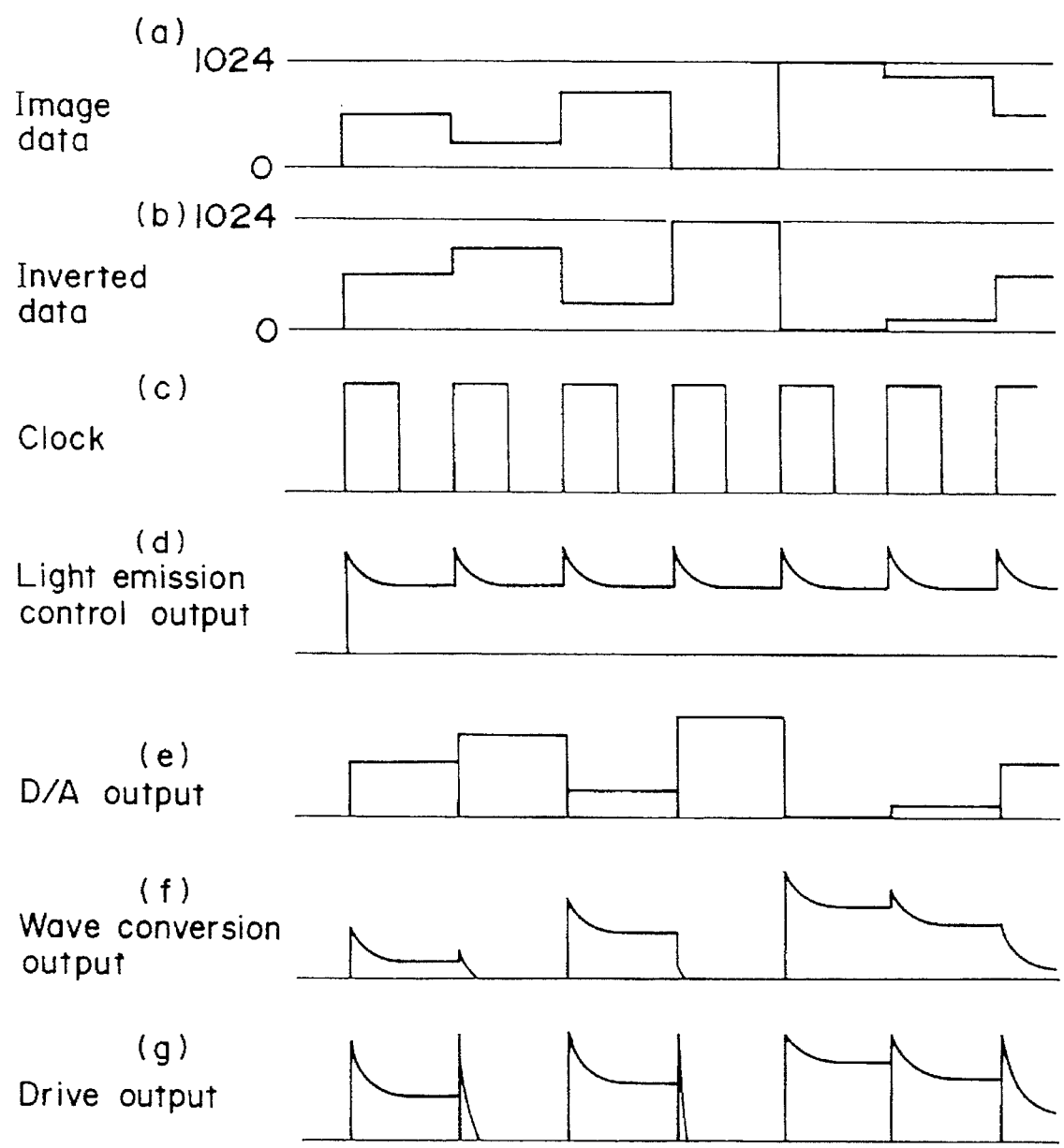
FIG. 4 is a diagram of signal waveforms on the conversion of waveform.

FIG. 4 illustrates the processing of image data in the printer control system shown in FIG. 3. Image data (a) of gradation level 0–1024 shown at the top are received from the FIFO memory 112 and inverted by the inversion circuit 114 as shown as inverted data (b). Then, the image data are converted to analog signals (e) to be sent to the waveform conversion circuit 116. On the other hand, the differential waveform generator 132 differentiates clock signals (c), received from the clock generator 131, at the rising edge of the clock signals to generate differential waveforms having a peak at the rising edge. The differential waveform is offset by a certain amount by the offset circuit 134 as shown as light emission control output signals (d) and sent to the waveform conversion circuit 116. The waveform conversion circuit 116 synthesizes (or subtracts in this embodiment) the two waveforms as shown as output signal (f). That is, a difference of the light-emission control output signals (d) of the offset circuit 134 from the output signal (e) of the D/A converter 115 is detected and if the output signal (e) of the D/A converter 115 is larger than the light-emission control output signal, the latter signal is set to be zero. Thus, the image signals (a) are converted to waveforms having a peak.

Further, in order to keep the peak height constant, the gain of the amplifier 117 is set according to the image signal for each pixel and the output signal of the waveform conversion circuit 116 is amplified at the amplifier 117. Thus, the drive signal (g) outputted by the drive I/O circuit 119 has a constant peak height after the synthesis while changing the waveform at the rising edge. The laser diode 121 changes the light emission power according to the drive signal.

In this embodiment, the image data are inverted first and converted to analog signals. It is desirable that the peak height of the light-emission control output signal (d) is larger somewhat than the output signal (e) of D/A conversion. It is appropriate that the peak height is as large as 1.05 to 2 times the output signal (e) though it depends on the waveform of the differential wave (or time constant) and the offset value. On the other hand, the offset value of the offset setting circuit 134 is preferably 50–90 % of the peak height of the light-emission output signal (d).

Figure 5:
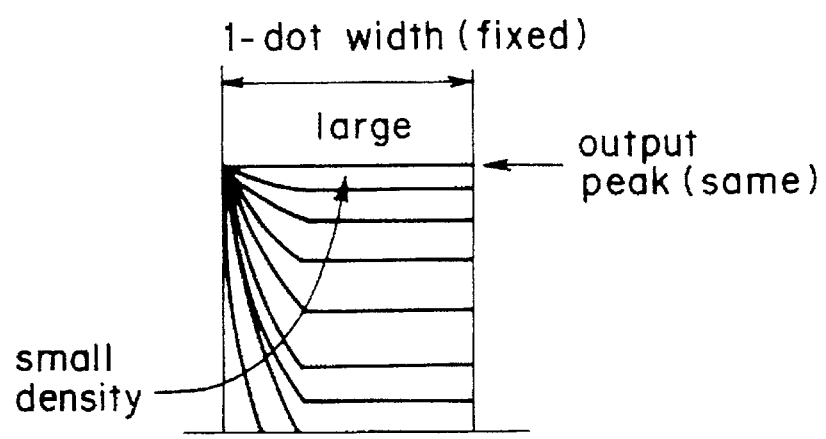
FIG. 5 is a diagram for illustrating a change in waveform of drive output signal according to gradation change.

FIG. 5 shows schematically an example of the waveforms of the drive output (g) which change with gradation level. The one-dot width (or pulse width) is fixed and the peak heights of the output signals are kept the same at the rising edge of the clock signals. It is clear in FIG. 5 that when the image data is small, the pulse width increases with increasing drive output (as shown by an arrow in FIG. 5) because the gain of the peak waveform portion becomes larger with decreasing image data up to the maximum peak width. When the image data signal becomes larger further, the conversing level of the drive signal increases with increasing image data while the peak width is kept substantial the same.

As explained above, in this embodiment, desired waveforms can be obtained relatively easily by subtracting the D/A output signal (e) varying according to image data from the 10 light emission control output signal (d) having a peak in the analog circuit and generated constantly.

Figure 6:
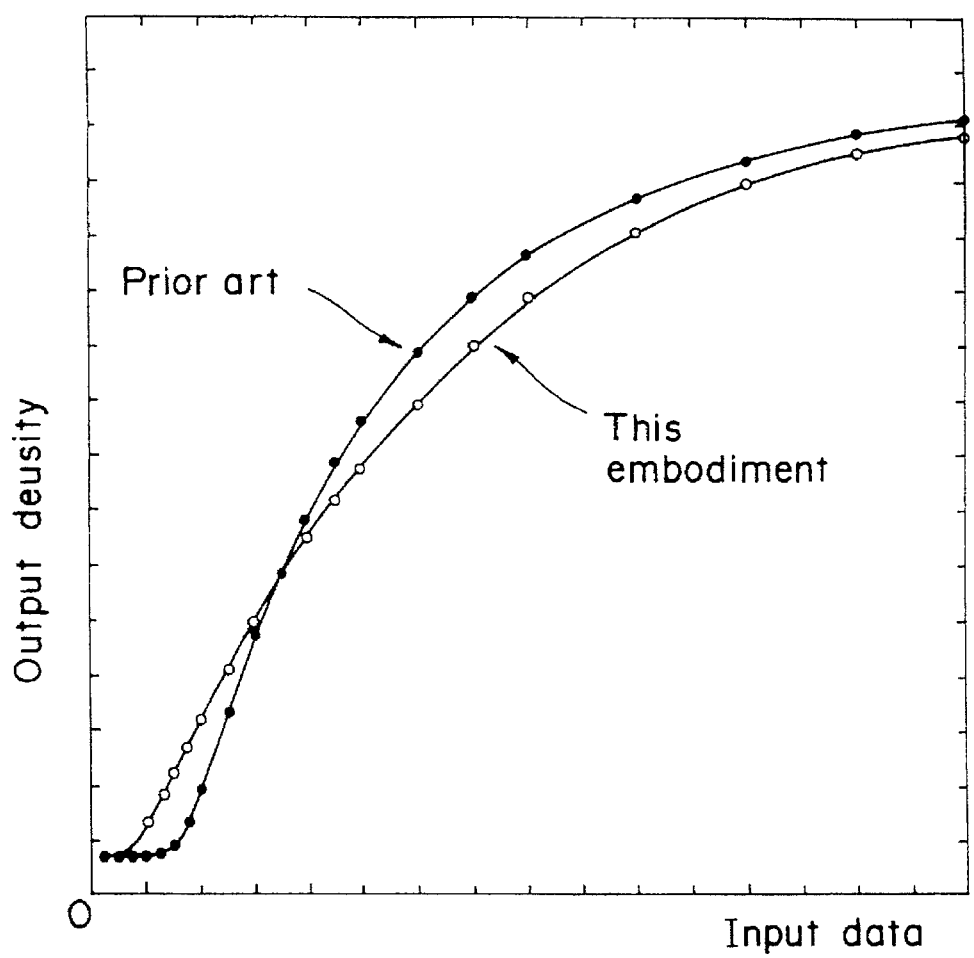
FIG. 6 is a diagram of output density characteristic.

FIG. 6 shows the output density characteristics of this embodiment after exposure, development, transfer and fixing plotted against the input data (image data) as well as the counterpart for a prior art intensity modulation. It is shown clearly that the output density characteristic of this embodiment rises very fast at low densities (at the high-light portion). Further, the slope of the output density against the input data becomes more gradual up to high input data.

Figure 7:
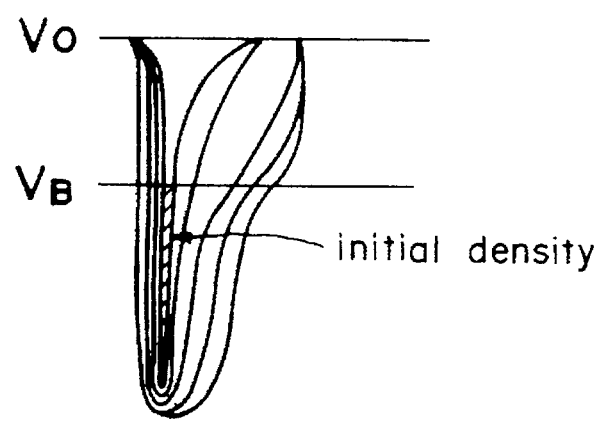
FIG. 7 is a diagram of attenuation potential in intensity modulation in this embodiment.

FIG. 7 illustrates schematically why the output density characteristic rises fast, wherein the potential distribution on the surface of the photoconductor is shown to change when the image data increases gradually from zero. An electrostatic latent image is formed by exposing the photoconductor after sensitized uniformly at a potential $V_o$, and toners adhere if the potential of the latent image becomes lower than the development bias potential $V_B$. In other words, the development begins to occur after the latent image potential is decreased from the potential $V_o$ to below the development bias potential $V_B$. In this embodiment, even if the image data is small, the drive output signal has a large peak value though the peak width is narrow. Therefore, the latent image potential is likely to decrease on exposure below the development bias potential $V_B$ even if the image data is small. Though the average quantity of light on the photoconductor is the same as in prior art intensity modulation, the light emission intensity is strong partially at the peak of the differential wave and this enhances the decrease in the potential at the portion exposed most intensely. The shaded area shown in FIG. 7 corresponds to the initial density when the image data is increased.

Figure 8:
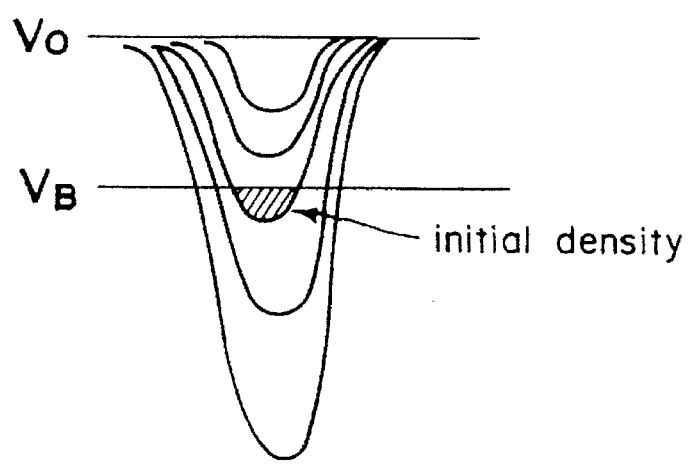
FIG. 8 is a diagram of attenuation potential in intensity modulation of a prior art.

FIG. 8 shows schematically the potential distribution of a prior art intensity modulation for comparison. In this case, when the image data is increased, the decrease in the latent image potential is smaller for small image data. Toners begin to adhere after image data increases to a somewhat larger value. In other words, the output density does not appear until image data increases to a somewhat larger value. On the contrary, as explained above, in this embodiment shown in FIG. 7, the peak value is large even for small image data so that toners begin to adhere even at small image data.

Figure 9:
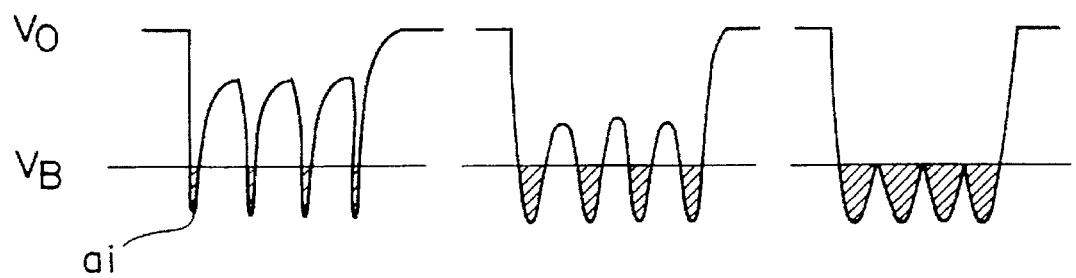
FIG. 9 is a diagram of attenuation potential in intensity modulation in this embodiment.
Figure 10:
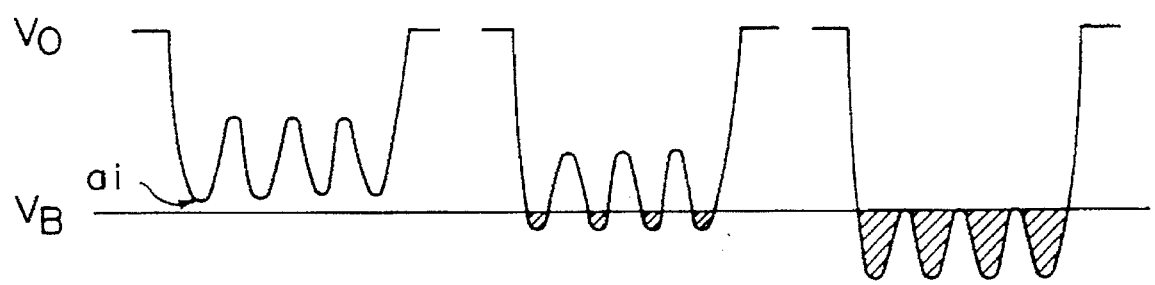
FIG. 10 is a diagram of attenuation potential in intensity modulation of a prior art.

FIG. 9 show schematically the latent image potential of an image of four dots when the image data is increased at three steps (from left to right) in this embodiment, while FIG. 10 shows the counterpart of the prior art intensity modulation. Shaded areas in the drawings means indicate areas on which toners are adhered. In this embodiment, the intensity modulation signal has a peak even for small image data so that the lowest value "ai" of the latent image potential is substantially decreased. Therefore, toners are likely to be adhered even at smaller image data if compared with the prior art intensity modulation. In this embodiment, as shown at the left side in FIG. 9, toners adhere at a small image data. On the contrary, in the prior art shown at the left side in FIG. 10, toners are not adhered at the same small image data.

In the gamma correction for realizing an object reproduction characteristic (for example the linear output characteristic wherein the output density changes linearly with read image data), the correction amount of the gamma correction can be decreased in this embodiment because the nonlinearity of the output density characteristic becomes smaller as shown in FIG. 6. Therefore, it is an advantage of this embodiment that the change of reproduction characteristic becomes smaller against external disturbances such as environment and secular change.

Especially, the output density characteristic begins to rise early at smaller image data. Therefore, the reproduction at a highlight portion is stabilized. Further, the quality of the reproduction can be improved substantially. Still further, the dynamic range of the reproduction characteristic is widened and the effective gradation degree can be increased.

It is to be noted that even if the gain of the amplifier 117 is kept constant at each pixel without using the gain setting circuit 141 and the gain change circuit 142, the drive signal for the laser diode 121 has a peak. Therefore, the nonlinearity of the gradation characteristic can be decreased if compared with the prior art intensity modulation.

In the first embodiment explained above, the laser diode 121 is driven for light emission in the whole period of a basic period. However, in a modified embodiment, a non-light-emitting period may be provided in a basic period by using the clock change circuit 104. When the waveform of the output signal of D/A conversion of image data is carried out by using the differential wave as a control signal, the clock change circuit 104 generates modulation clocks having the duty ratio of light-emitting period at a value less than 100%. Thus, a non-light-emitting period is forced to exist periodically in the L/D driver. Because a non-light-emitting period is provided in each basic period according to the duty ratio, linear patterns are formed perpendicularly to the laser scan direction and they cancel the noises along the laser scan direction. Therefore, the image reproduction becomes very smooth and the image quality of reproduced image can be improved.

Figure 11:
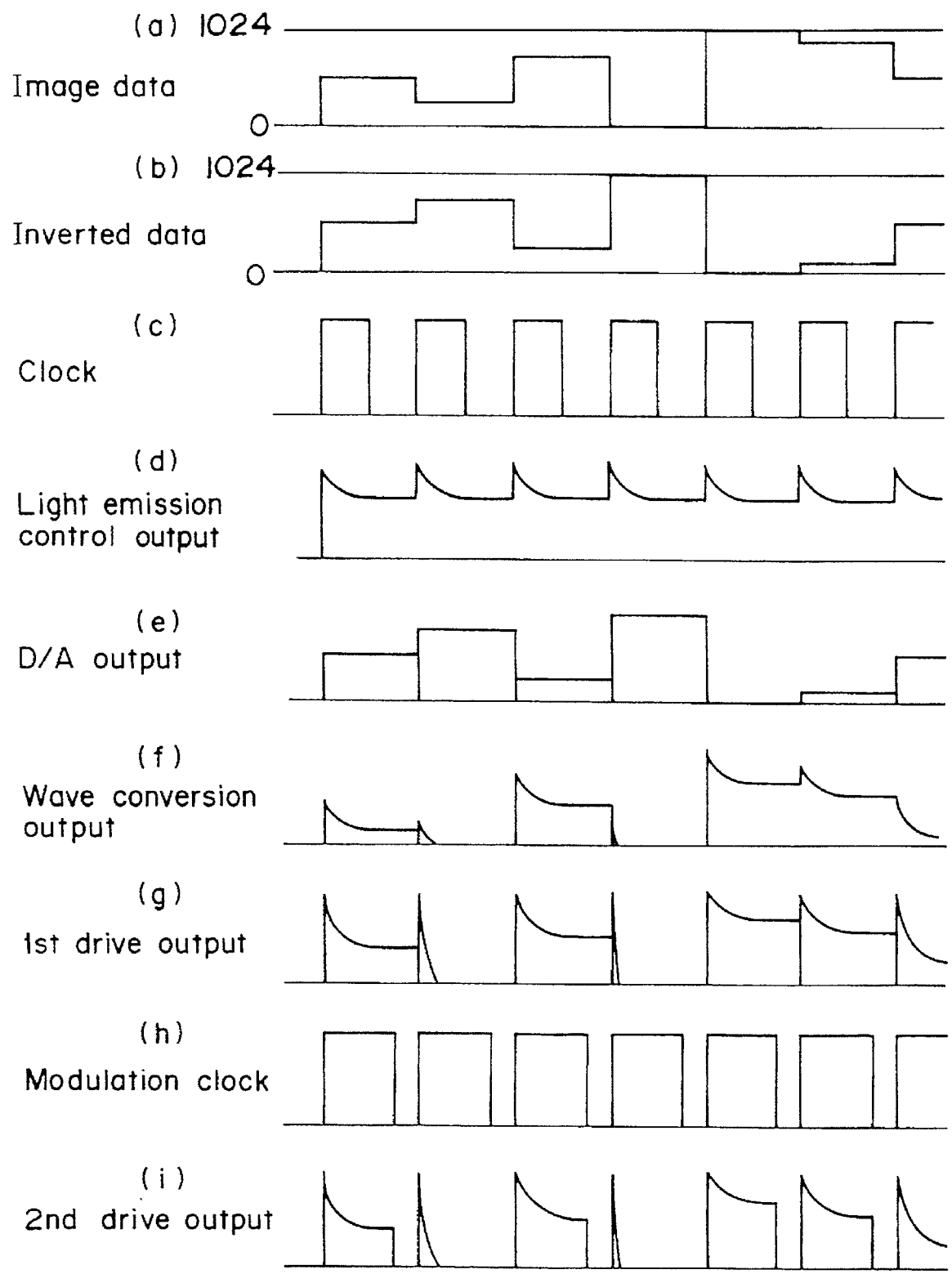
FIG. 11 is a diagram of signal waveforms on the conversion of waveform.

FIG. 11 shows the waveform conversion when a duty ratio of 75% is set. The waveform conversion is performed similarly to that in FIG. 4 and a first drive signal (g) according to received image data (a) is sent to the laser diode driver 120. The waveforms (a)–(g) are the same as in FIG. 4. On the other hand, the printer controller 101 sends a clock change signal to the clock change circuit 104 according to a duty ratio designated by a user, and modulation clock signals (h) are supplied by the gain change circuit 104 according to the clock change signal. The first drive signal (g) received from the drive I/O circuit 119 is modulated according to the duty ratio of the modulation clock signals (h) by the L/D driver 120 to generate second drive signals (i) having the same duty ratio. In this example, the modulation clock signals (h) have a duty ratio of 75% (or high level in 75% of a basic period of the clocks of the clock generator 131 and low level in 25 % of the basic period). That is, the laser diode driver 120 sends received first drive signals (g) as second drive signals (i) for the laser diode 212 only during 75% of the basic period.

A basic period of modulation clocks may consist of a plurality of the pixels, say two pixels. In this case, the laser diode 121 is not driven for the whole period for each pixel. If the duty ratio is 75%, the second drive signals (i) have the light-emitting period of one and a half pixels at an intensity of for example an average of the image signals of the two pixels and a non-light-emitting period of the following half pixel.

Figure 12:
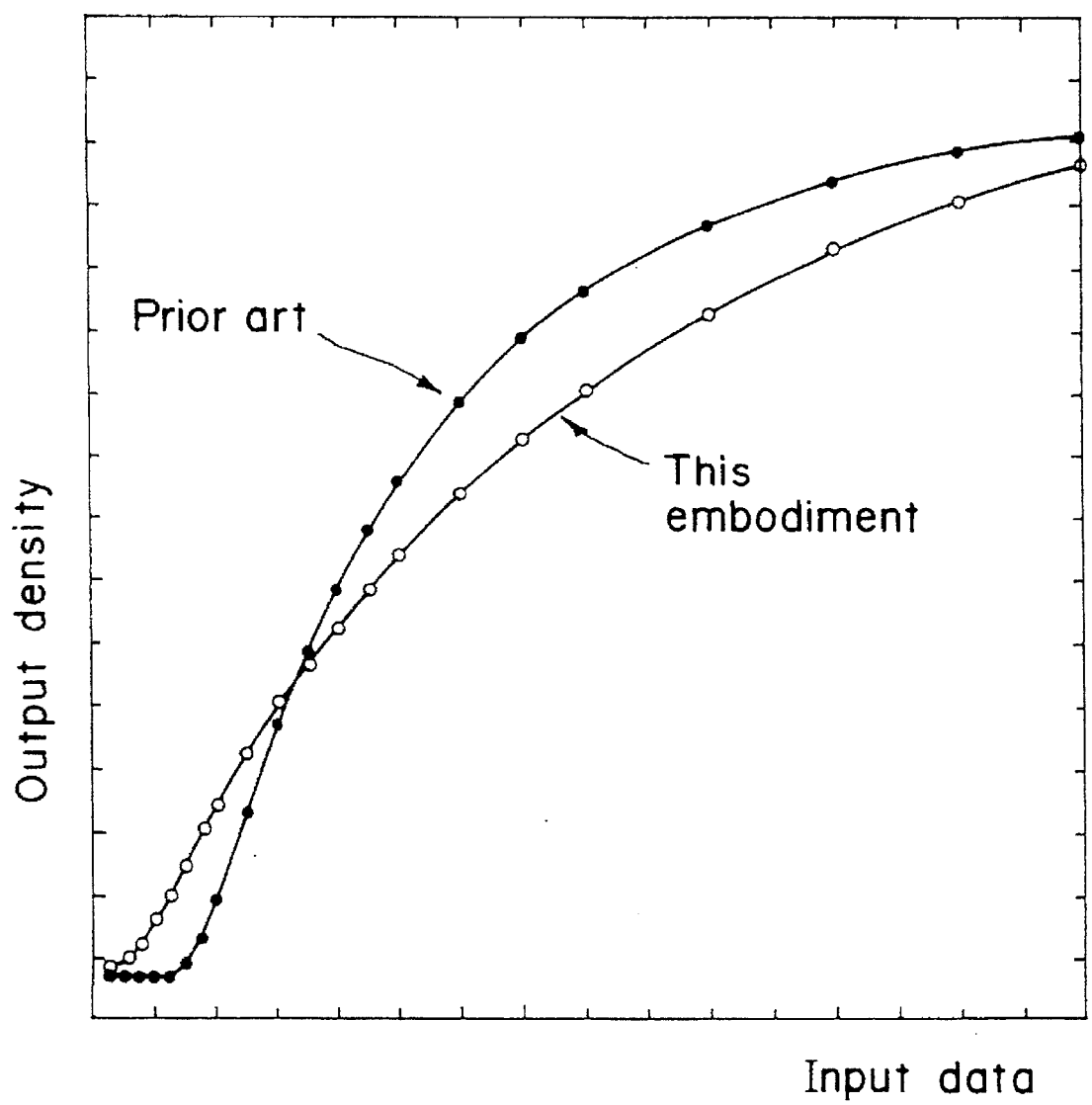
FIG. 12 is a diagram of output density characteristic.

By providing such non-light-emitting periods, low density regions are formed between dots when toners are adhered. Then, the saturation of the density at high image data becomes delayed. FIG. 12 shows the output density characteristics (reproduction characteristic) of this case after exposure, development, transfer and fixing plotted against the input data (image data) as well as the counterpart for prior art intensity modulation. It is shown clearly that the output density characteristic of this embodiment rises faster at low densities (at the high-light portion) even compared with the embodiment shown in FIG. 4 of 100% of duty ratio. Further, the slope of the output density against the input data also becomes very gradual up to high input data. Therefore, the output density characteristic of the electrophotographic process itself has a very small slope and this improves the smoothness of image further.

Preferably, the maximum value of laser power is increased according to the duty ratio. For example, if the duty ratio X is 75%, the maximum laser power P is controlled to have a value of $P_o \times (100/X)$ wherein $P_o$ denotes the maximum laser power P for 100% of duty ratio. Thus, the average quantity of light on the surface of the photoconductor drum 41 is kept the same so that the maximum density does not change. By using this exposure control, the rise of the output density characteristic becomes faster further and the saturation of the density is delayed further. Thus, the nonlinearity of the output density characteristic can be improved further.

B. Second Embodiment

Figure 13:
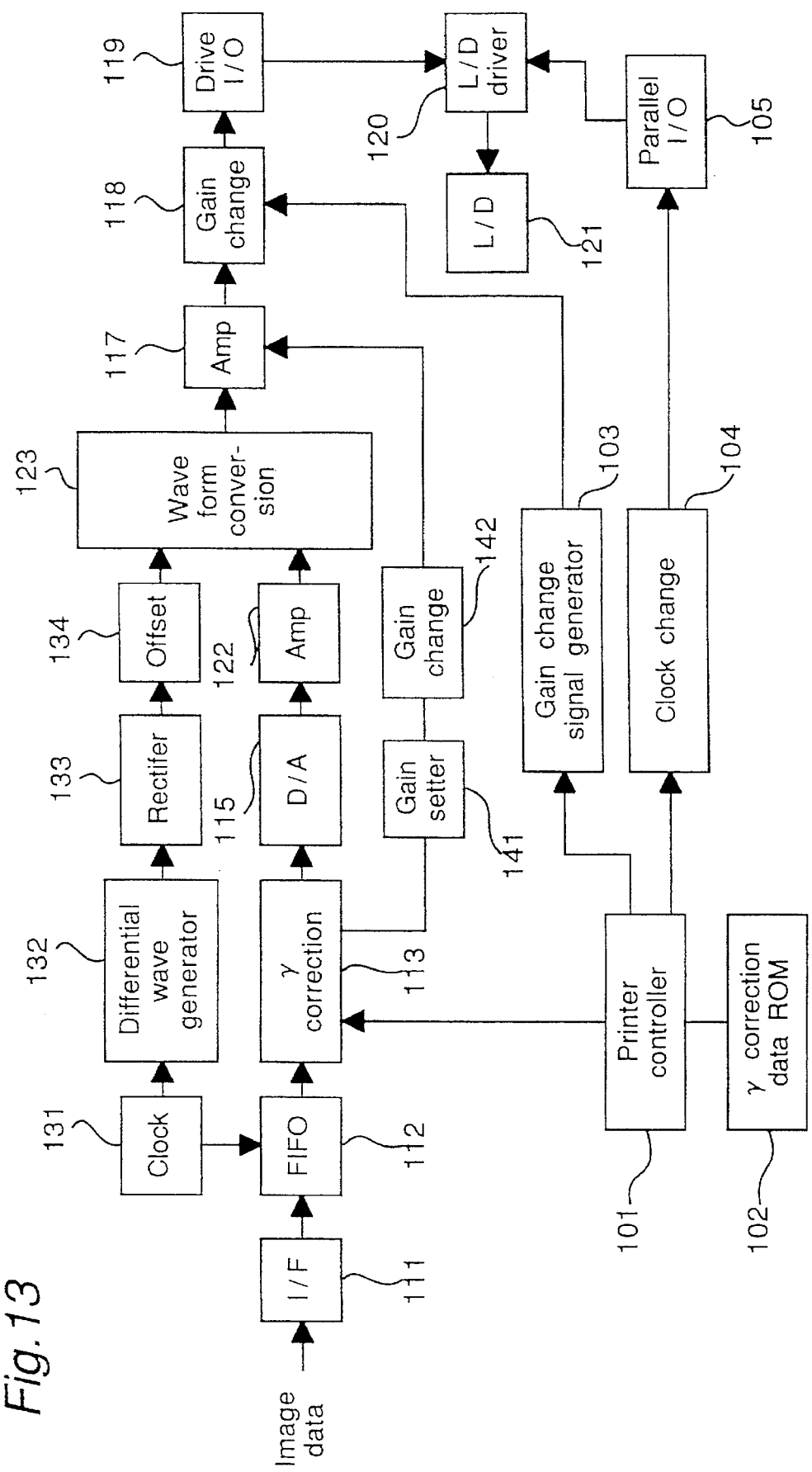
FIG. 13 is a block diagram of a control system of the copying machine in a second embodiment.

FIG. 13 shows a part of a printer control system of this embodiment. This system differs from that of the first embodiment (FIG. 3) on the waveform synthesis. In this embodiment, the D/A output of image data varying at each pixel is added to the light-emission control signal or differential wave having a peak generated continuously so as to generate drive signals having a peak.

That is, a waveform conversion circuit 123 adds the analog output signal of a D/A converter 115 to a differential wave as a light emission control signal received through a rectifier 133 from a differential wave generator 132. The inversion circuit 114 used in the first embodiment is not needed and an amplifier 122 is added between the D/A converter 115 and the waveform conversion circuit 123. When a waveform is synthesized, it is desirable that the differential wave has a value of about 5–50% of the maximum of the analog output signal to be synthesized of the D/A converter 115 after amplification. Therefore, the amplifier 122 amplifies the analog output signal of the D/A converter 115 with an appropriate gain and sends the output signal to the waveform conversion circuit 123. The other components in this control system are the same as the counterparts in the first embodiment, and detailed explanation thereof is not described here.

Figure 14:
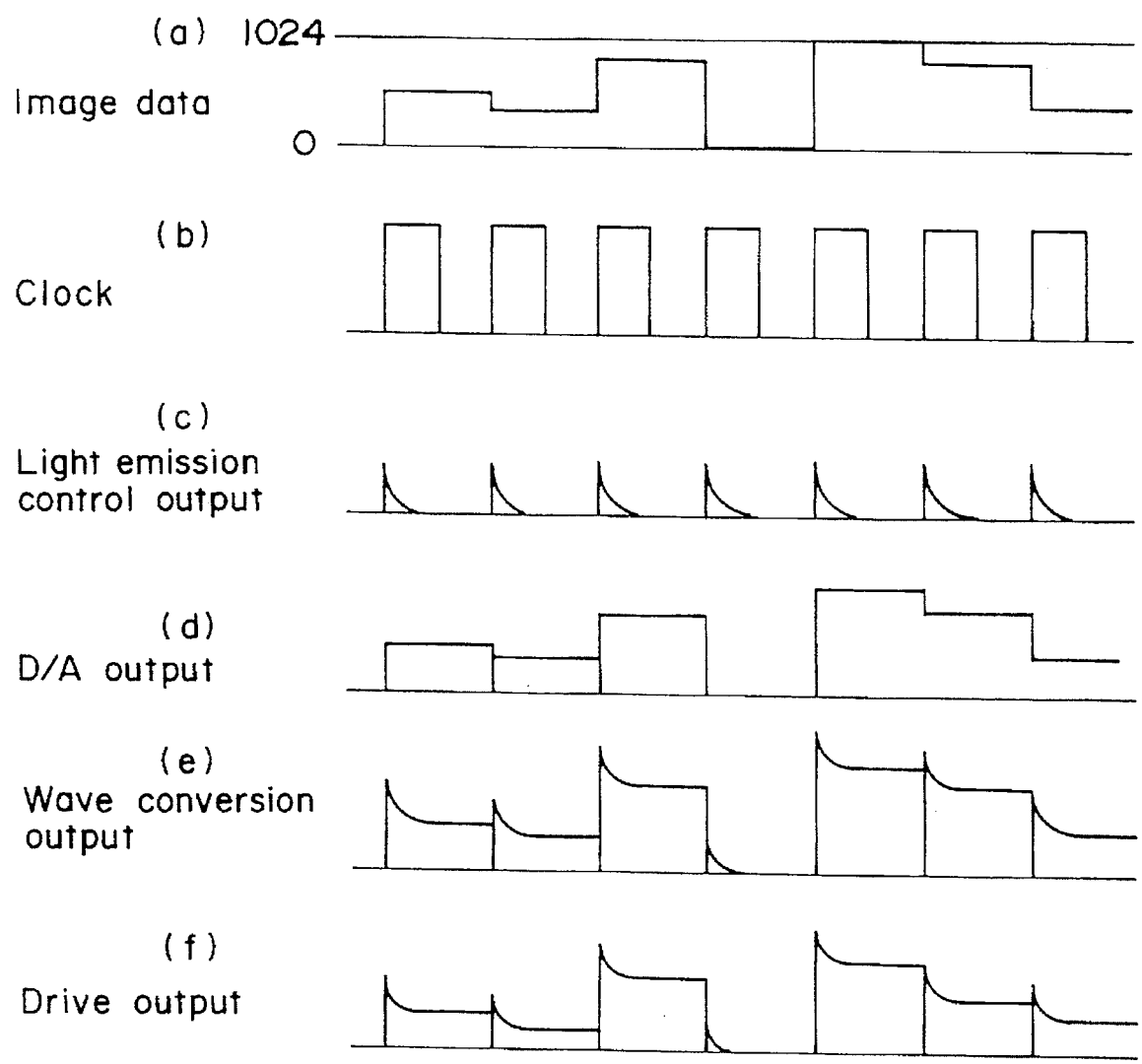
FIG. 14 is a diagram of signal waveforms on the conversion of waveform.

FIG. 14 shows signal processing when the gain of the amplifier 117 is constant without using the gain setter 141 and the gain change circuit 142. Image data (a) of gradation level 0–1024 shown at the top are received from the FIFO memory and are converted to analog signals (d) to be sent to the waveform conversion circuit 123. On the other hand, the differential waveform generator 132 differentiates clock signals (b), received from the clock generator 131, at the rising edge to generate differential waveforms having a peak at the rising edge of the clock signals. The differential waveform is offset by a certain amount by the offset circuit 134 as shown in light emission control output signals (c) to be sent to the waveform conversion circuit 123. Thus, the resultant differential wave has a constant peak. In contrast to the light-emission control output signals (d) shown in FIG. 4, the signals (c) of this embodiment have peaks, but they do not have a constant portion. The waveform conversion circuit 123 synthesizes (or adds in this embodiment) the two waveforms to generate output signals (e) having a peak for each pixel. Thus, the image data (a) are converted to drive signals (f) having a peak at the rising edge of the clock signals (b) in the laser diode driver 120.

In this embodiment, the output density characteristic has a rise at a small value in the high-light portion (at low densities) similarly to that shown in FIG. 6. The slope thereof also becomes gradual until high density portion. Thus, the image reproduction can be stabilized at low densities.

Figure 15:
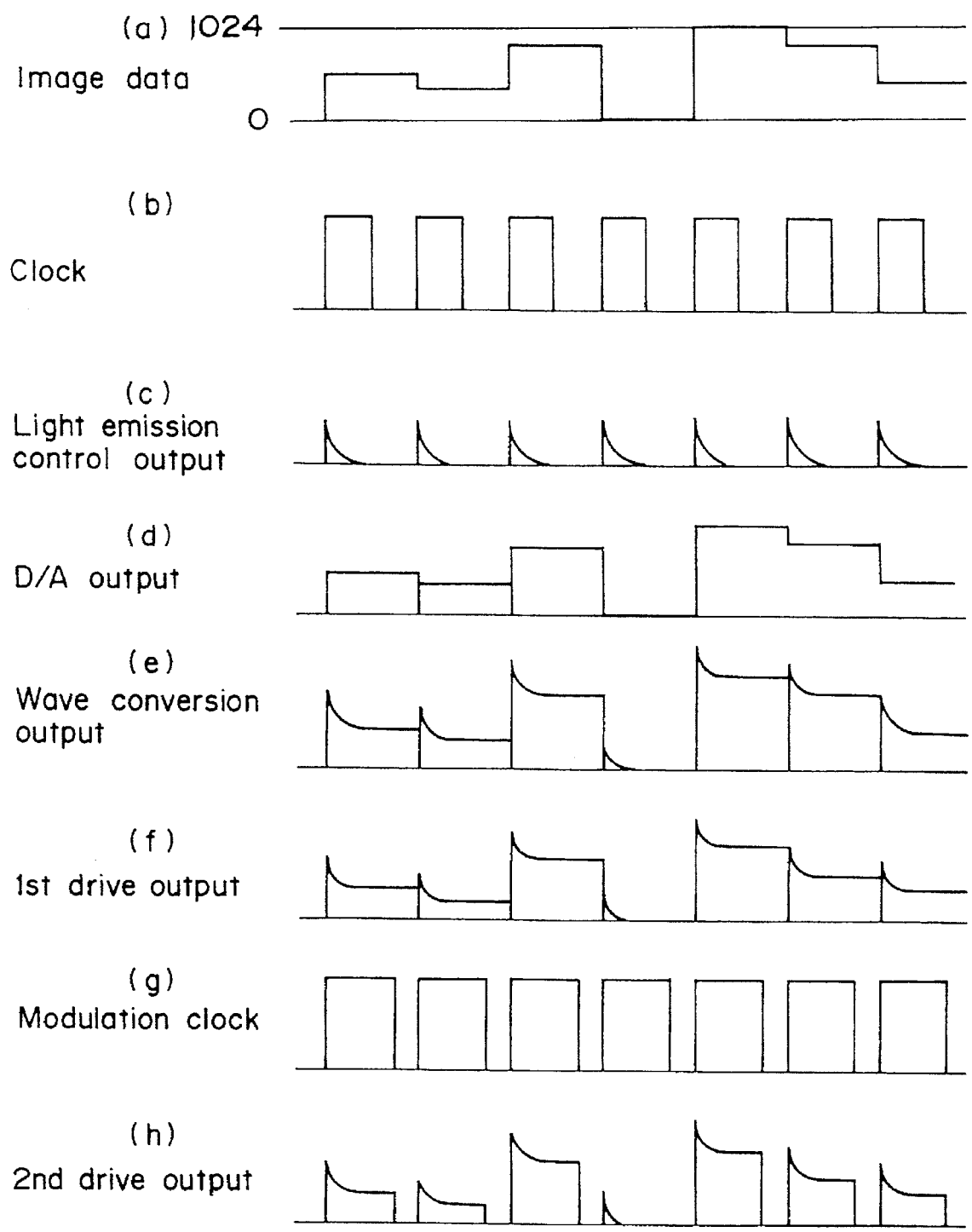
FIG. 15 is a diagram of signal waveforms on the conversion of waveform.

The nonlinearity of the output density characteristic can be improved further by changing the duty ratio of modulation clock signals with a clock change circuit 104 as in the modified embodiment of the first embodiment. FIG. 15 shows the waveform conversion when a duty ratio is set at 75 %. In this case, the laser diode 121 is not driven for the whole period for each pixel, but at the duty ratio 75%. The waveform conversion is performed similarly to that in FIG. 14 and drive signals are sent to the laser diode driver 120. The signals (a)–(f) are the same as the counterparts in FIG. 14. The nonlinearity of the output density characteristic can be reduced further if the gain is preferably changed for each pixel, as in the first embodiment, by using the gain setter 141 and the gain change circuit 142 so that the peak height of the output signal is kept constant. On the other hand, modulation clock signals (g) of 75% of duty ratio are supplied by the clock change circuit 104 according to a clock change signal, and the drive signals (h) generated by the drive I/O circuit 119 are modulated according to the duty ratio of the modulation clock signals (g). That is, the laser diode driver 120 sends drive signals (f) as drive signals (h) only in 75% of each basic period. A basic period may consist of a plurality of the basic periods (or pixels) of the clock signals of the clock generator 131.

By providing such non-light-emitting periods, the reproduced image becomes smooth. The saturation of the density at high image data becomes delayed, similarly to that in FIG. 12. Further, the slope of the output density against the input data becomes very gradual up to high input data. Therefore, the output density characteristic (reproduction characteristic) of the electrophotographic process itself has a very small slope and this improves the smoothness of image further. Preferably, the maximum of laser power is increased according to the duty ratio. Then, the rise of the gamma characteristic becomes faster further and the saturation of the density is delayed further. Thus, the nonlinearity of the gamma characteristic can be improved further.

C. Third Embodiment

In this embodiment, the form of differential wave is changed by changing the RC constant of the differentiation for each pixel to change the level of differential wave conversion. This differentiation technique can change the decay rate of the peak of differential wave surely, but the speed of the waveform change is slow. Then, this technique can be applied to a printer using a low frequency of laser oscillation. In a printer control system of this embodiment shown in FIG. 16, the RC constant of the differentiation in a differential wave generator 214 is changed by a constant setter 215 according to image data after corrected in the gamma correction circuit 213. The differential wave generator 214 generates differential waves having a peak.

Figure 16:
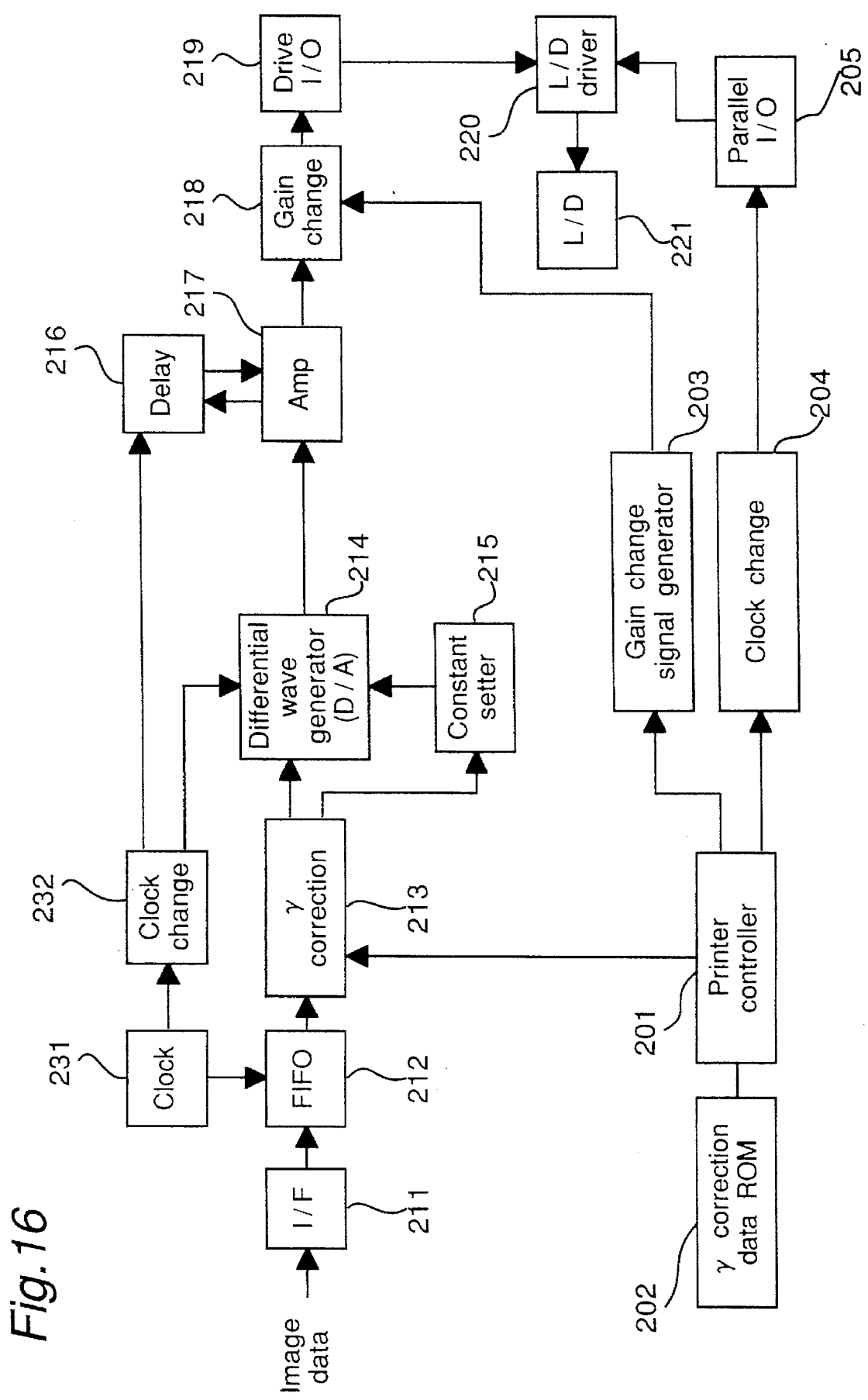
FIG. 16 is a block diagram of a control system of the copying machine in a third embodiment.

The printer control system shown in FIG. 16 is explained in detail below. The printer section 200 is controlled by a printer controller 201 having a central processing unit. Multi-level image data received from the buffer memory 30 via an interface 211 are stored in a first-in first-out (FIFO) memory 212. A clock generator 231 supplies clock signals to the first-in first-out memory 212 and to a clock change circuit 232. When a latent image is formed, the printer controller 201 sends gamma correction data read from a ROM 202 to a gamma correction circuit 213. The image data read from the FIFO memory 212 are corrected by the gamma correction circuit 213.

The corrected image data are sent to a waveform conversion circuit 214 and to the gain setter 215. The waveform conversion circuit 214 converts the received data to an analog signal with the digital-to-analog (D/A) conversion and differentiates the analog signal. The differential wave generator 214 includes differentiation circuits having RC constants different from each other of a number equal to the gradation number, say 256, of the image signals. The constant setter 215 sets a larger RC constant with decreasing input value in the differential wave generator 215. On the other hand, a clock change circuit 232 generates clock signals to be sent to the differential wave generator 214 and to a delay circuit 216. The differential wave generator 214 generates differential waves in synchronization with the clock signals by using the RC constant set by the setter 215. Then, the waveform of the differential wave at the rising edge can be changed. It is preferable that the clock signals used for the waveform conversion have an appropriate duty ratio because the polarity of the generated differential waves is inverted at the rising and trailing edges of the clock signals.

Preferably, the differential wave is rectified by a rectifier 133 to remove an inverse polarity portion of the output, as in the first embodiment. By using the inversion period, an advantage similar to that of the above-mentioned use of appropriate duty ratio can be obtained. Further, it is also desirable to provide a reset circuit for resetting the differential wave generator 214 at the modulation frequency.

The output signal of the differential wave generator 214 is amplified by an amplifier 217. The printer controller 201 sets a gain of the entire system to correct the effects of the photoconductor sensitivity, the environment and the like and it is sent to a gain change circuit 203. A gain change signal generated by the gain change circuit 203 is sent to a gain change circuit 218. The output signal of the amplifier 217 is further amplified by the gain change circuit 218 with the resulting signal to be sent via a drive input/output (I/O) circuit 219 to a laser diode (L/D) driver 220. The driver 220 drives the laser diode 221 according to drive signals having peaks. On the other hand, the printer controller 201 sends a signal to a clock change circuit 204 to change the duty ratio of modulation clocks for driving the laser diode 221. The modulation clocks of the designated duty ratio are sent via a parallel input/output (I/O) circuit 205 to the L/D driver 220. Thus, the drive signals generated by the L/D driver 220 can be modulated with the duty ratio.

The output density characteristic of this embodiment has a rise at a small value in the high-light portion (at low densities) similarly to that in FIG. 6. The slope thereof also becomes gradual until high density portion. Thus, the image reproduction can be stabilized at low densities. The nonlinearity of the output density characteristic can be improved further by providing non-light-emitting period.

D. Fourth Embodiment

Figure 17:
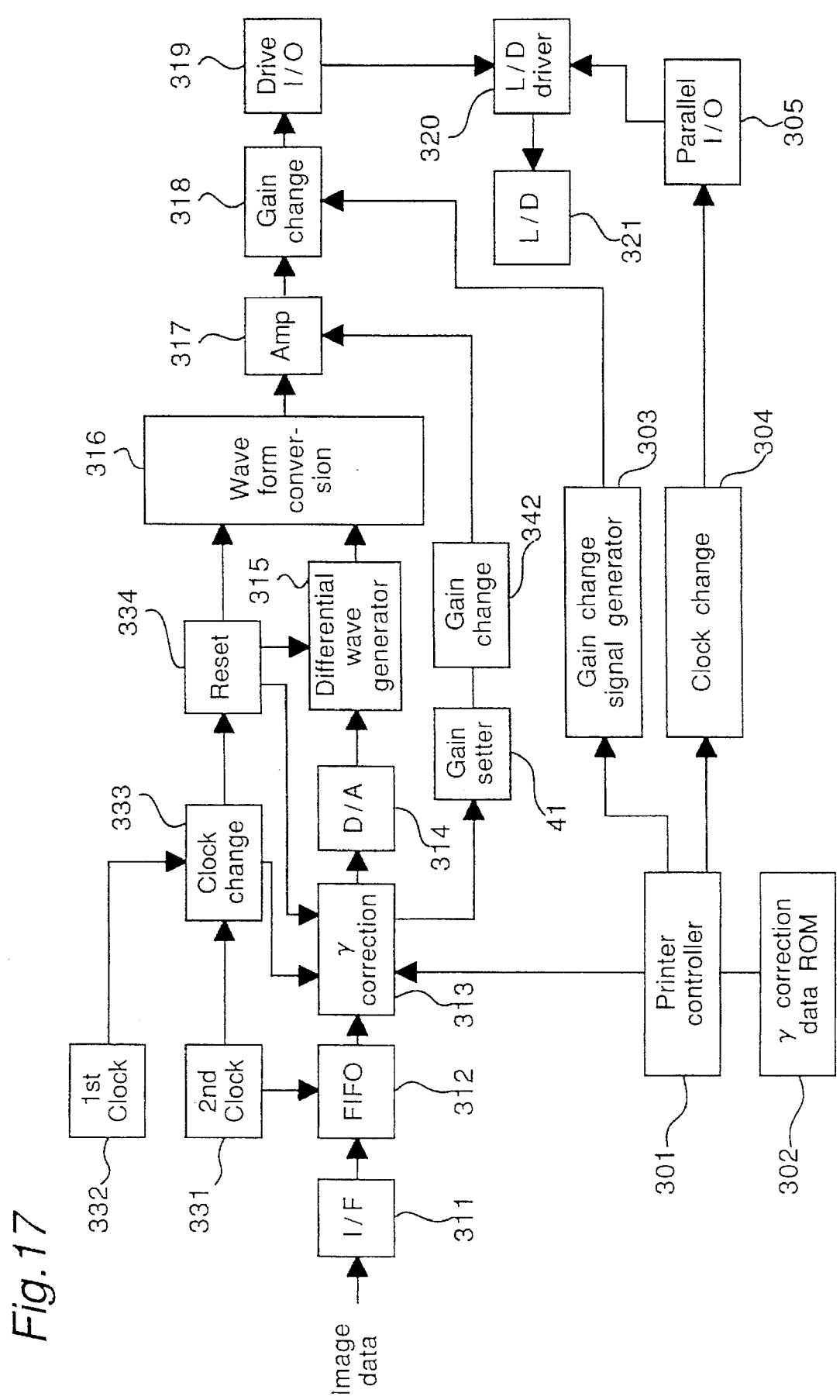
FIG. 17 is a block diagram of a control system of the copying machine in a fourth embodiment.

In this embodiment, the waveform is converted by differentiating the output signals themselves of digital-to-analog conversion of the image signals. FIG. 17 shows a printer control system of this embodiment. The printer section 200 is controlled by a printer controller 301 having a central processing unit. The multi-level image data received from the buffer memory 30 via an interface 311 are stored in a first-in first-out (FIFO) memory 312. In order to form a latent image on a photoconductor, a printer controller 301 sends gamma correction data read from a ROM 302 to a gamma correction circuit 313. The image data read from the FIFO memory 312 are corrected by the gamma correction circuit 313. The corrected value is converted to an analog signal by a digital-to-analog converter 314 and sent to a differential wave generator 315. The differential wave generator 315 generates differential waves by differentiating the analog signal received from the digital-to-analog converter 314 and the differential waves are sent to a waveform conversion circuit 316.

On the other hand, the clock signals generated by the second clock generator 331 as well as those generated by the first one 332 are sent to a clock change circuit 334, which sends clock signals to the gamma correction circuit 313 and to a reset circuit 334. The reset circuit 334 sends a reset signal to the gamma correction circuit 313, to the differential wave generator 315 and to a waveform conversion circuit 316.

The waveform conversion circuit 316 removes inverted portions from the differential waves to generate analog signals for driving the laser. The analog signal is amplified next by an amplifier 317 to have a constant peak height. A gain of the amplifier 317 is set by a gain setter 41 according to the output of the gamma correction circuit 313 in order to keep the maximum of the peak voltage at a constant level for each dot, and a change circuit 342 sends the gain set by the gain setter 341 to the amplifier 317.

The printer controller 301 sets a gain of the entire system to correct the effects of the photoconductor sensitivity, the environment and the like to be sent to a gain change circuit 303. A gain change signal generated by the gain change circuit 303 is sent to a gain change circuit 318. The output signal of the amplifier 317 is further amplified by the resulting signal change circuit 318 with the gain to be sent via a drive I/O circuit 320 to a laser diode driver 319. The driver 320 drives the laser diode 321 according to drive signals having peaks.

The drive signals may have a duty ratio different from 100%. The printer controller 301 sends a signal to a clock change circuit 304 to change the duty ratio of modulation clocks for driving the laser diode 321. The modulation clocks of the designated duty ratio are sent via a parallel input/output (I/O) circuit 305 to the laser diode (L/D) driver 320. Thus, the drive signals generated by the L/D driver 320 can be modulated with the duty ratio.

Figure 18:
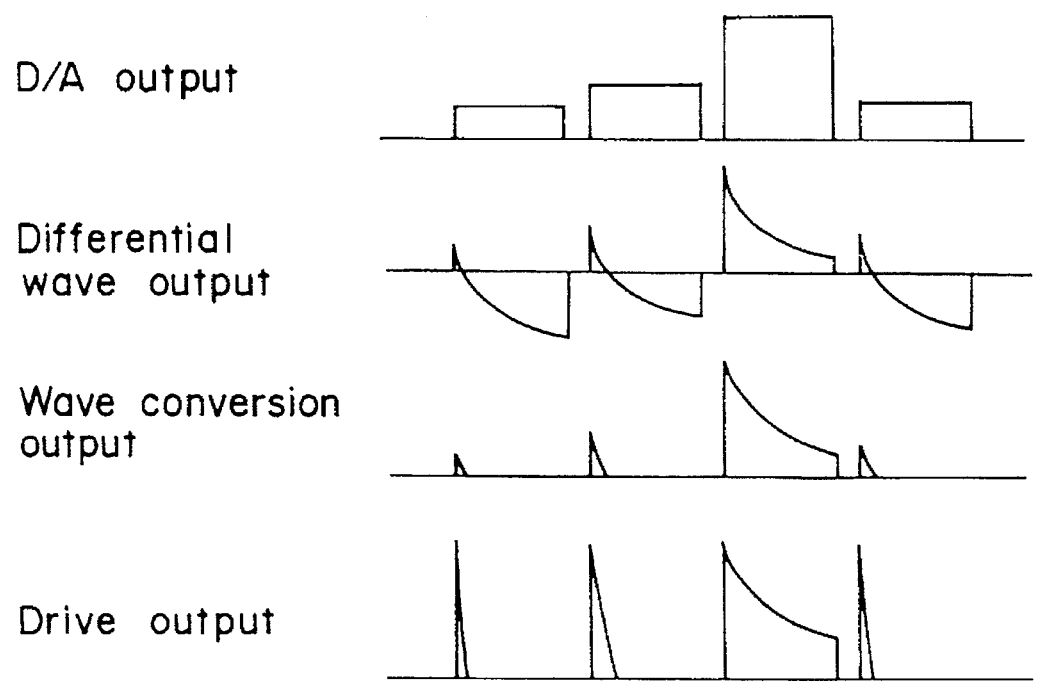
FIG. 18 is a diagram for illustrating a situation on waveform conversion.

FIG. 18 shows an example of the waveform conversion. The differential wave generator 315 generates differential waves from the analog output signal of the digital-to-analog converter 314. The differential waves are next rectified by the waveform conversion circuit 316 to generate waveform conversion output signals. The output signals are next amplified by a gain set for each pixel so as to have drive output signals with a constant peak height. In this processing, the reset circuit 334 resets the waveform conversion circuit 316 to divide each signal in order to prevent a differentiation of a difference of two consecutive signals or to process only one pixel each time.

In this embodiment, the output density characteristic has a rise at a small value in the high-light portion (at low densities) similarly to that in FIG. 6. The slope thereof also becomes gradual until high density portion. Thus, the image reproduction can be stabilized at low densities. The nonlinearity of the output density characteristic can be improved further by providing non-light-emitting period.

E. Fifth Embodiment

The above-mentioned embodiments relate to the intensity modulation of laser exposure. However, this invention can also be applied to pulse width modulation of laser exposure. In the prior art pulse width modulation, the pulse width of drive signals for driving the laser is modulated according to the density of each dot. Thus, the light-emitting time of the laser is changed under a constant optical intensity to form dots having a size in correspondence to the density. In general, the potential of exposed portions of the photoconductor is relatively uniform irrespective of density because the density is represented by using the dot size. However, if the pulse width of drive signal is very small, the potential does not decrease sufficiently and the latent image becomes unstable. Further, the rise of the density in the gradation characteristic is slow.

Figure 19:
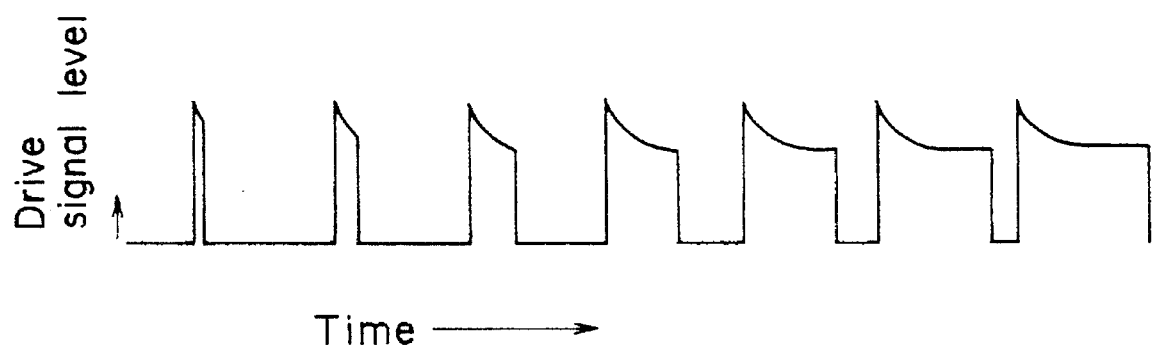
FIG. 19 is a diagram of an example of drive signal in pulse width modulation.

In the pulse width modulation of this embodiment, drive signals having a peak are provided by using differential waves. That is, as shown in FIG. 19, the drive signals do not have rectangular waveforms, but have a peak at the rising edge of the pulse or drive signal. Then, the image density becomes stable even at low densities, and the nonlinearity of the gradation characteristic can be decreased. In order to generate such drive signals, a known conversion circuit (pulse width generator) generates signals having pulse widths in correspondence to each dot. For example, the conversion circuit may be provided after the gamma correction circuit 113 in the system shown in FIG. 13, while differential waves are generated at the clock period. Then, the pulse width of the differential waves are changed according to the pulse widths generated by the conversion circuit in order for the drive signals to have a pulse width according to each dot. Thus, the resultant drive signals of different pulse widths have a peak.

The output density characteristic of this pulse width modulation has a rise at a small value in the high-light portion (at low densities), so that the image reproduction can be stabilized at low densities.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image forming apparatus for forming an image with electrophotographic process, comprising:
   a photoconductor;
   an exposure device for exposing the photoconductor with a light beam;
   a conversion device for converting image signals on a density of pixels of an image to be formed to a peak waveform which rises to a peak and substantially instantaneously thereafter decays from the peak, said peak waveform having said peak for each period of a predetermined number of pixels;

a detecting device for detecting a level of the peak received from said conversion device for each period;

an amplifier for amplifying the peak waveform based on the level of the peak detected for each period by said detecting device so as for the peak thereof to have a predetermined level; and a driving device for driving the exposure device according to the peak waveform amplified by said amplifier.

2. The image forming apparatus according to claim 1, said conversion device comprising:

a generation device for generating a peak signal having said peak for each period of the predetermined number of pixels; and a synthesis device for synthesizing the peak signal generated by the generation device and an image signal to generate the peak waveform.

3. The image forming apparatus according to claim 1, wherein said conversion device converts an image signal having a rectangular wave to said peak waveform.

4. The image forming apparatus according to claim 3, wherein said conversion device converts the image signal to a differential wave having a decay rate which varies with the image signal.

5. The image forming apparatus according to claim 1, wherein said conversion device converts an image signal converging with a predetermined decay rate to a level decreasing with decrease in a level of the image signal.

6. The image forming apparatus according to claim 1, further comprising an amplifier for amplifying the peak waveform to keep a peak height of each peak waveform constant.

7. The image forming apparatus according to claim 1, wherein said conversion device converts an image signal to a peak waveform having a slope increasing with decreasing image signal.

8. The image forming apparatus according to claim 1, wherein said conversion device changes a peak width of the peak waveform for low density image signals and changes a conversion level of the peak waveform for high density image signals.

9. The image forming apparatus according to claim 1, further comprising a light emission controller for providing a time to prohibit the exposure of the light beam in each period of the predetermined number of pixels.

10. The image forming apparatus according to claim 1, wherein the predetermined level is a constant level.

11. The image forming apparatus according to claim 1, wherein the predetermined level is larger than a maximum level of the image signals.

12. The image forming apparatus according to claim 11, wherein the peak waveform converted by said conversion device has a peak of a value more than five percent of a maximum level of the image signals.

13. An image forming apparatus for forming an image with electrophotographic process, comprising:

a photoconductor;

an exposure device for exposing the photoconductor with a light beam;

a differential circuit for generating a differential wave;

a conversion device for converting image signals on the density of pixels of an image to be formed to a peak waveform which rises to a peak and substantially instantaneously thereafter decays from the peak, said peak waveform having said peak for each period of a predetermined number of pixels based on the differential wave generated by said differential circuit; and a driving device for driving the exposure device according to the peak waveform received from the conversion device.

14. The image forming apparatus according to claim 13, wherein said circuit differentiates a synchronization signal used for determining an exposure timing of each pixel to generate the differential wave.

15. The image forming apparatus according to claim 13, wherein said circuit differentiates an image signal to generate the peak signal.

16. The image forming apparatus according to claim 13, wherein said conversion device comprises a synthesis device for synthesizing the differential wave generated by the differential circuit and an image signal to generate the peak waveform.

17. An image forming apparatus comprising:

a photoconductor;

an exposure device for performing a luster scan with a light beam on the photoconductor to form an electrostatic latent image;

a controller for controlling an intensity of the light beam emitted by said exposure device according to an image signal on a density of a pixel of an image to be formed and for controlling the intensity of the light beam emitted by said exposure device to rise to a peak in each period for exposure and to substantially instantaneously thereafter decays from the peak.

18. The image forming apparatus according to claim 17, wherein said controller controls the peak of the light beam to have a constant value.

19. The image forming apparatus according to claim 17, wherein said controller differentiates clock signals determining an exposure timing for each pixel to form peak signals having said peak and controls the intensity of the light beam according to data synthesized from the peak signals and the image signal.

20. An image forming apparatus for forming an image with electrophotographic process, comprising:

a photoconductor;

an exposure device for exposing the photoconductor with a light beam;

a memory for storing digital image data;

a digital-to-analog converter for converting the digital image data to an analog image signal on a density of pixels of the image;

a conversion device for converting the analog image signal converted by said digital-to-analog converter to a peak waveform which rises to a peak and substantially instantaneously thereafter decays from the peak, said peak waveform having said peak for each period of a predetermined number of pixels; and a driving device for driving the exposure device according to the peak waveform received from the conversion device.

21. The image forming apparatus according to claim 20, further comprising a differential circuit for generating a differential wave for generating the peak waveform from the analog image signal.

22. The image forming apparatus according to claim 21, wherein the differential circuit changes a duty ratio of the driving device by the analog image signal.

23. An image forming apparatus for forming an image with electrophotographic process, comprising:

a photoconductor;

an exposure device for exposing the photoconductor with a light beam;

a conversion device for converting image signals on a density of pixels of an image to be formed to a peak waveform which rises to a peak and substantially instantaneously thereafter decays from the peak, said peak waveform having said peak for each period of a predetermined number of pixels, the peak being located at an early position in each period; and a driving device for driving the exposure device according to the peak waveform received from the conversion device.

* * * * *